United States Patent [19]

Nowakowski

[11] Patent Number: 4,516,066
[45] Date of Patent: May 7, 1985

[54] DUAL-VOLTAGE BATTERY CHARGING SYSTEM

[75] Inventor: Robert J. Nowakowski, Indianapolis, Ind.

[73] Assignee: General Motors Corporation, Detroit, Mich.

[21] Appl. No.: 518,669

[22] Filed: Jul. 29, 1983

[51] Int. Cl.³ .............................................. H02J 7/14
[52] U.S. Cl. ........................................ 320/15; 307/16; 320/17; 320/64; 322/59; 322/26
[58] Field of Search ................... 320/6, 14, 15, 17, 61, 320/64, 68, 67, 19; 322/69, 70, 89, 90, 28; 307/16

[56]  References Cited
U.S. PATENT DOCUMENTS

| 3,611,091 | 10/1971 | Genovese | 320/19 X |
| 3,671,843 | 6/1972 | Huntzinger et al. | 320/15 |
| 3,863,127 | 1/1975 | Raver | 320/15 |
| 4,055,789 | 10/1977 | Lasater | 320/14 X |

Primary Examiner—R. J. Hickey
Attorney, Agent, or Firm—C. R. Meland

[57] ABSTRACT

A battery charging system for a dual-voltage motor vehicle electrical system that has a pair of series-connected batteries that can energize an electric cranking motor. One of the batteries is charged from a diode-rectified alternating current generator. A voltage regulator regulates the output voltage of the generator and includes a switching means connected in series with the field winding of the generator to control field current. The other battery is charged by field discharge current that is produced by the voltage induced in the generator field winding when the switching means is switched to a nonconductive state.

6 Claims, 1 Drawing Figure

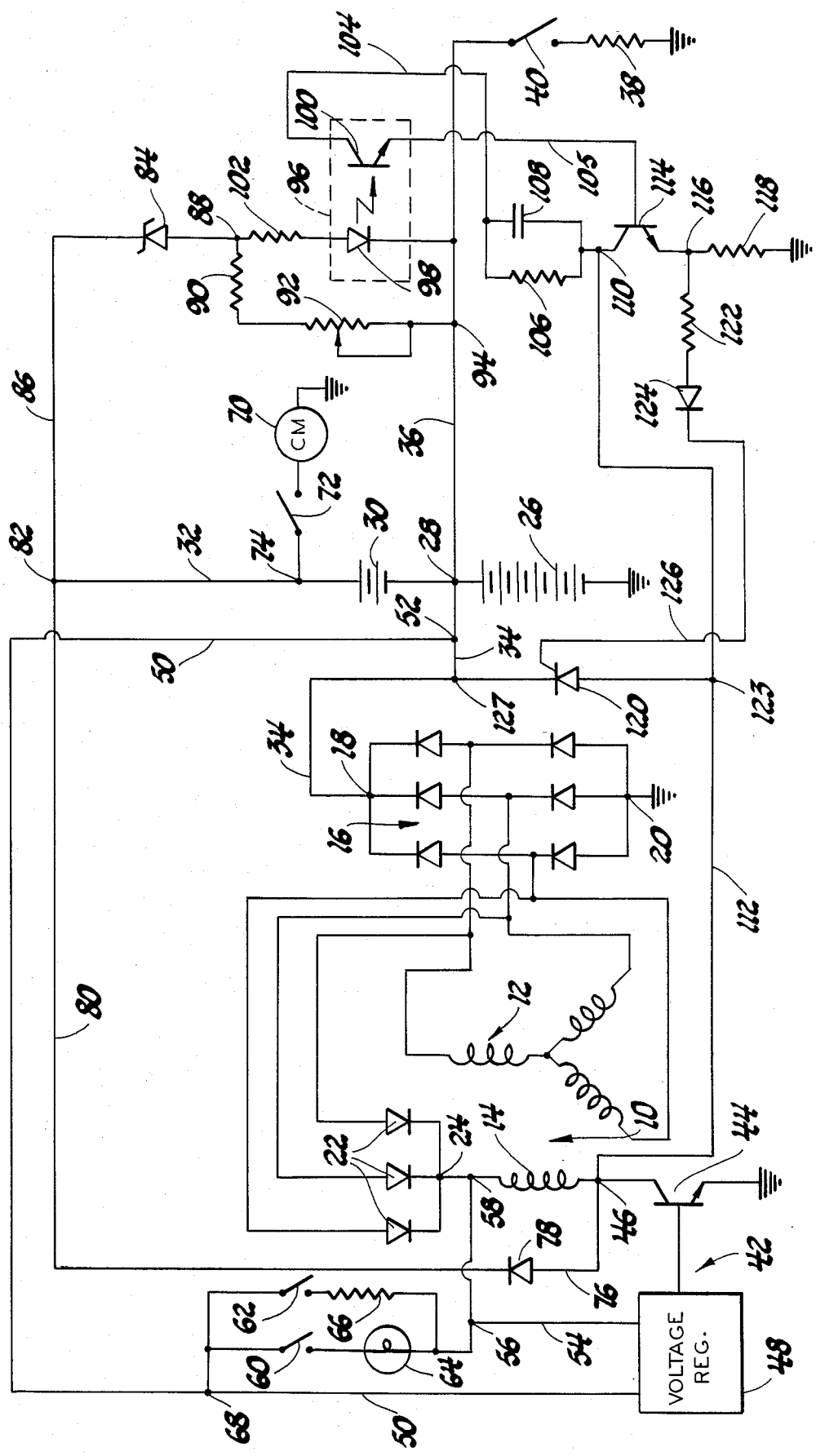

DUAL-VOLTAGE BATTERY CHARGING SYSTEM

This invention relates to a battery charging system for a dual-voltage motor vehicle electrical system where a pair of series-connected batteries are utilized to provide a voltage that corresponds to the sum of the terminal voltages of the batteries for energizing an electric cranking motor, and where one of the batteries feeds the accessory loads on the vehicle.

Dual-voltage motor vehicle electrical systems that utilize two series-connected batteries are known, examples being the systems disclosed in the U.S. patent to Huntzinger et al U.S. Pat. No. 3,671,843 and to Raver U.S. Pat. No. 3,863,127. In these systems, one of the batteries, which may be termed the "accessory battery", is charged directly from the engine driven battery-charging generator. The other battery, which may be termed a "cranking battery", may be used only for engine cranking and it is charged by auxiliary apparatus energized by the vehicle generator. In the Huntzinger et al patent, the auxiliary apparatus comprises a DC-to-DC converter, and in the Raver patent the auxiliary apparatus comprises a transformer-rectifier.

It is an object of this invention to provide a dual-battery charging system that utilizes the energy stored in the field winding of the battery-charging alternator to charge the cranking battery. In carrying this object forward, a circuit is provided for charging the cranking battery by field-discharge current that is produced when a switching device of a voltage regulator that is connected in series with the field winding turns off. The circuit connecting opposite ends of the field winding to the cranking battery comprises a diode, an ignition switch, and a generator tell-tale lamp.

Another object of this invention is to provide a system for charging the cranking battery by generator field discharge current that includes means for sensing the terminal voltage of the cranking battery and diverting field discharge current from the cranking battery when the terminal voltage of the cranking battery reaches a value indicative of a fully charged condition. This prevents overcharging the cranking battery. More specifically, a switching device, such as a controlled rectifier, is gated conductive when the terminal voltage of the cranking battery attains a predetermined value. The controlled rectifier is connected to the generator field winding in such a manner as to provide a path for field discharge current that does not include the cranking battery.

IN THE DRAWING

The single FIGURE drawing is a schematic circuit diagram of a battery charging system made in accordance with this invention.

Referring now to the drawing, the reference numeral 10 generally designates an alternating current generator which has a three-phase Y-connected output winding 12 and a field winding 14. The field winding 14 is carried by the rotor of the generator in a manner well known to those skilled in the art, and the rotor is driven by the engine of the motor vehicle (not illustrated). The three-phase output winding 12 is connected to a three-phase full-wave bridge rectifier 16 which is comprised of six diodes. The bridge rectifier 16 has a positive direct voltage output terminal 18 and a negative direct voltage output terminal 20 which is grounded.

The output winding 12 is connected to the anodes of three diodes, each designated by reference numeral 22. The diodes 22 form a so-called "diode trio" and the cathodes of the diodes are connected to a junction 24. A direct voltage is developed between junction 24 and ground which serves to energize the field winding 14 of the generator in a manner which is well known to those skilled in the art.

The motor vehicle electrical system has an accessory battery which is designated by reference numeral 26. The accessory battery 26 is a 12-volt battery and the positive terminal thereof is connected to a junction 28. The negative terminal of battery 26 is grounded, as illustrated. The electrical system also has a 4-volt cranking battery 30 which is utilized only for energizing an electric cranking motor. The cranking battery 30 has its negative terminal connected to junction 28 and its positive terminal is connected to a conductor 32. In the drawing, the batteries 26 and 30 have been illustrated as separate batteries, but it is to be understood that a single battery case or container could be provided which would include both batteries 26 and 30 and in such an arrangement the battery case would have a terminal corresponding to the junction 28 as well as positive and negative terminals.

The accessory battery 26 is charged from the direct voltage output terminals 18 and 20 of the bridge rectifier 16 and to this end, the positive direct voltage output terminal 18 is connected to junction 28 by a conductor 34. The conductor 34 is connected to a conductor 36 at junction 28 and the conductor 36 feeds the 12-volt accessory loads on the motor vehicle. One of the 12-volt accessory loads is designated by the reference numeral 38, and it is energized whenever a switch 40 is closed. It is to be understood that there are are a plurality of vehicle accessory loads that can be connected to the conductor 36 so as to be energized thereby.

The output voltage of the alternating current generator 10 is regulated to maintain a desired regulated voltage between conductor 34 and ground by a voltage regulator which has been generally designated by reference numeral 42. The regulated voltage may be, for example, 14 volts in a 12-volt system. The voltage regulator 42 can be of a type disclosed in the U.S. patent to Harland et al U.S. Pat. No. 3,579,654. The voltage regulator comprises an output transistor 44 having a collector connected to junction 46 and an emitter which is grounded. The transistor 44 may actually comprise a pair of Darlington-connected transistors, as is illustrated in the above-referenced Harland et al patent. The voltage regulator 42 further includes voltage regulator circuitry 48 of the type disclosed in the above-referenced Harland et al patent which is connected to the base of transistor 44 and which biases transistor 44 to conductive and nonconductive states. The circuitry 48 responds to the voltage applied to a voltage-sensing lead which is designated by reference numeral 50 and which is connected to a junction 52 so as to sense the voltage applied to the accessory battery 26. Another conductor 54 is connected to the voltage regulator circuitry 48 and this conductor is connected to junction 56. The junction 56 is connected to a junction 58 located between the field winding 14 and the direct voltage output terminal 24 of the diode trio. The conductor 54 provides an input voltage to the voltage regulator circuitry 48 in a manner disclosed in the above-referenced Harland et al patent.

The reference numerals 60 and 62 respectively designate an ignition switch and an accessory switch for the motor vehicle electrical system. These switches are arranged such that when the ignition system for the engine of the motor vehicle is energized, both switches 60 and 62 are closed. The switch 60 is connected in series with a generator charge indicator lamp 64, and the switch 62 is connected in series with a resistor 66. When switches 60 and 62 are closed, the indicator lamp 64 and the resistor 66 are connected in parallel and between junctions 56 and 68.

As will be more fully described hereinafter, the voltage regulator 42 senses the voltage appearing between junction 52 and ground and operates to cause the switching transistor 44 to switch on and off to thereby control field current in the field winding 14.

The reference numeral 70 designates an electric cranking motor which is energized when the switch 72 is closed to crank the engine on the motor vehicle. One side of the cranking motor 70 is grounded and when switch 72 is closed, the opposite side of the cranking motor is connected to a junction 74 and, hence, to the positive side of the cranking battery 30. This applies the combined terminal voltages of the batteries 26 and 30 to the cranking motor 70 so that it is energized with 16 volts.

The cranking battery 30 is charged by the field discharge current developed as a result of the voltage induced in the field winding 14 when the transistor 44 is biased nonconductive. The circuit for charging the battery 30 can be traced from junction 46, through conductor 76, through diode 78, through conductor 80 to junction 82, through conductor 32 to the positive side of battery 30, through battery 30 to junction 28, and then back to the opposite side of the field winding 14 via conductor 50, junction 68, closed switches 60 and 62, the parallel-connected indicator lamp 64 and resistor 66, and then to junction 58. As will be more fully described hereinafter, each time the output transistor 44 goes nonconductive, a voltage is induced in field winding 14 that develops a field discharge current that is utilized to charge the battery 30.

The battery charging system of this invention includes a voltage-responsive control or voltage regulator for terminating the supply of charging current to the cranking battery 30 whenever its terminal voltage reaches some value indicative of an adequately charged condition, for example, 5 volts. This control includes a Zener diode 84, one side of which is connected to junction 82 by a conductor 86. The opposite side of the Zener diode 84 is connected to a junction 88. A resistor 90 and a variable resistor 92 are connected in series between junction 88 and junction 94 located on conductor 36. The control circuitry further includes an opto-isolator 96 which comprises, in a single package, a light-emitting diode 98 and a silicon NPN phototransistor 100. When the light-emitting diode 98 is energized, it applies light energy to the phototransistor 100 to cause it to conduct in its collector-emitter circuit. The opto-isolator 96 is known to those skilled in the art and may be, for example, a Litronix type 4N25.

The light-emitting diode 98 is connected in series with a resistor 102, one end of which is connected to the junction 88. The collector of the phototransistor 100 is connected with a conductor 104, while the emitter of phototransistor 100 is connected with a conductor 105. The conductor 104 is connected to one side of a circuit comprising the parallel-connected resistor 106 and capacitor 108. The opposite side of this circuit is connected to a junction 110 which, in turn, is connected to a conductor 112. The conductor 112 is connected to one side of field winding 14 at junction 46.

An NPN transistor 114 has its collector connected to junction 110 and has a base connected to conductor 105. The emitter of transistor 114 is connected to junction 116 and a resistor 118 is connected between junction 116 and ground. The junction 116 is connected to the gate electrode of a controlled rectifier 120 via the resistor 122, diode 124, and conductor 126. The anode of controlled rectifier 120 is connected to conductor 112 at junction 123 and the cathode of controlled rectifier 120 is connected to conductor 34 at junction 127.

The operation of the battery charging system will be described first under a condition of operation in which it is assumed that the battery 30 is in such a condition of charge, as represented by its terminal voltage, that it requires charging current. As previously mentioned, the voltage regulator 42 controls the field current in field winding 14 so as to maintain a desired regulated voltage between conductor 34 and ground. The voltage regulator 42 senses the voltage between conductor 34 and ground via conductor 50 and when this voltage exceeds the desired regulated value, it causes the transistor 44 to switch off. The output voltage of the generator 10 now decreases and when the voltage between conductor 34 and ground decreases below the desired regulated value, the transistor 44 is switched back on to complete a circuit for the field winding 14 between junction 24 and ground. The transistor 44 continuously switches on and off in response to changes in the voltage between conductor 34 and ground to regulate the output voltage of the generator 10. Each time the transistor 44 switches off, a voltage is induced in the field winding 14 which has a polarity that is positive at the junction 46. In normal voltage regulating systems, the field winding 14 is shunted by a field discharge diode in order to prevent destruction of components connected with the field winding 14 by the voltage that is induced therein whenever the output switching transistor 44 goes nonconductive. In this invention, however, the current that is developed due to the voltage induced in the field winding 14 is utilized to charge the cranking battery 30 through the circuit that has previously been traced that includes the diode 78, the conductor 80 and the conductor 32. Thus, each time the transistor 44 goes nonconductive, a pulse of current is supplied to the battery 30 and the frequency of these pulses of current will depend upon the switching frequency of the transistor 44. This charging mode for charging battery 30 by field discharge current continues as long as controlled rectifier 120 remains nonconductive in its anode-cathode circuit. The controlled rectifier 120 is biased conductive in a manner to be more fully described hereinafter whenever the terminal voltage of the cranking battery 30 attains some predetermined value.

The terminal voltage of the cranking battery 30 is sensed by the circuit connected thereacross including Zener diode 84, resistor 102, and the light-emitting diode 98. When the terminal voltage of battery 30 exceeds some value, for example, 5 volts, the Zener diode 84 conducts in a reverse direction to energize the light-emitting diode 98. The resistors 90 and 92 shunt some of the input current from the opto-isolator 96 to allow adjustment of the control or regulator circuitry for the battery 30.

If the terminal voltage of the battery 30 is high enough to cause the light-emitting diode 98 to be energized, the phototransistor 100 will be biased conductive in its collector-emitter circuit. Assuming now that the transistor 44 has just turned off, a voltage is developed at junction 46 of, for example, 20 volts, which is coupled to junction 110 via conductor 112. This voltage is applied to the base of NPN transistor 114 through the parallel-connected resistor and capacitor 106 and 108, through the collector-emitter circuit of phototransistor 100 and conductor 105. This voltage will bias the NPN transistor 114 conductive so that the voltage on conductor 112 will now be applied to the gate of controlled rectifier 120 via the collector-emitter circuit of NPN transistor 114, diode 124, and conductor 126. When the controlled rectifier 120 is gated conductive in its anode-cathode circuit, the voltage on conductor 112 is applied to the junction 28 and the field discharge current now developed in field winding 14 is applied to the accessory battery 26. The path for field discharge current, when controlled rectifier 120 is conductive, can be traced from junction 46, through conductor 112 to the anode of controlled rectifier 120, through the anode-cathode circuit of controlled rectifier 120 to conductor 34, through the accessory battery 26 and accessory load 38 to ground, through the three diodes of the bridge rectifier 16 connected to grounded output terminal 20 and then through the diodes 22 to the opposite side of the field winding 14. Whenever controlled rectifier 120 is biased conductive, current is no longer supplied to the cranking battery 30 since the field discharge current is diverted away from the cranking battery 30 and into a circuit that includes the accessory battery 26 and accessory load 38. When the transistor 44 switches conductive, the voltage at junction 46 decreases, to lower the gate voltage to the gate of the controlled rectifier 120, and it shuts off since the voltage of its cathode will go higher than the voltage of the anode to thereby reverse-bias its anode-cathode circuit. As long as the terminal voltage of battery 30 exceeds a predetermined value, the controlled rectifier 120 is gated conductive each time the switching transistor 44 is biased nonconductive to provide a path for field discharge current that does not include the battery 30. Accordingly, the battery 30 will not receive field discharge current as long as its terminal voltage is above the predetermined value.

Each time the cranking motor 70 is energized, it utilizes energy that has been stored in the cranking battery 30, and eventually the terminal voltage of battery 30 will drop to some point indicative of the fact that battery 30 should be charged. When this occurs, the system reverts back to a mode of operation in which field discharge current is supplied to the cranking battery 30 via the circuit that includes diode 78 and the conductor 80.

The lamp 64 lights up when the generator output voltage is below a predetermined value indicative of low or no generator voltage. When generator output voltage is normal, the voltages at terminal 18 and junction 24 are substantially equal and accordingly the lamp 64 has substantially equal voltages applied to opposite ends thereof, and it is extinguished. The pulsating field discharge current that is at times supplied to battery 30 through the circuit that includes the lamp 64 does not cause the lamp to light.

By way of example, and not by way of limitation, the average direct current supplied to battery 30 may be approximately 0.5 amp where generator 10 is a type 15-SI generator manufactured by the Delco-Remy Division of General Motors Corporation. This average current may vary between approximately 0.3 to 0.7 amp, depending upon the magnitude of the 12-volt load 38 and the speed of the engine that drives the generator 10. There is a slight reduction in generator output current when field discharge current is being supplied to battery 30, for example, 1.0 amp when output transistor 44 is operating in a switching mode. At loads where transistor 44 remains continuously conductive (not switching), there is no loss of alternator output current since no field discharge current is coupled to the 4-volt battery 30.

The cranking motor 70 may be a 12-volt cranking motor, and the system of this invention provides 16 volts to the cranking motor so as to cause the cranking motor to develop a higher cranking speed as compared to a system that would energize the cranking motor with 12 volts. This is accomplished while maintaining 12-volt energization for all the other electrical accessories on the motor vehicle.

The embodiments of the invention for which an exclusive property or privilege is claimed are defined as follows:

1. A battery charging system for a dual-voltage motor vehicle electrical system comprising, first and second series-connected batteries, a generator having an output winding connected in circuit with said first battery for charging said first battery and having a field winding, means for energizing said field winding comprising a switching means connected in series with said field winding, means for causing said switching means to switch between conductive and nonconductive states as a function of the magnitude of the voltage generated in said output winding, and circuit means connecting said field winding to the terminals of said second battery for charging said second battery by field discharge current produced by the voltage induced in said field winding when said switching means is switched to a nonconductive state.

2. A battery charging system for a dual-voltage motor vehicle electrical system comprising, first and second series-connected batteries, an alternating current generator having an output winding and a field winding, rectifier means connected with said output winding and with said first battery for supplying charging current to said first battery, a field circuit for energizing said field winding from said output winding, voltage regulator means for maintaining the voltage applied to said first battery at a desired regulated value, said voltage regulator means comprising a switching means connected in series with said field winding and means responsive to the voltage applied to said first battery for controlling the switching state of said switching means, and circuit means including a diode connecting said field winding to the terminals of said second battery for charging said second battery by field discharge current produced by the voltage induced in said field winding when said switching means is switched to a nonconductive state.

3. A motor vehicle electrical system comprising, an accessory battery connectable to motor vehicle accessory loads, a cranking battery having a lower terminal voltage than said accessory battery, means connecting said batteries in series, an electric cranking motor, circuit means for energizing said cranking motor by said series-connected batteries, a generator having a field winding, said generator having an output winding connected to said accessory battery for supplying charging current thereto, voltage regulator means for maintaining the voltage applied to said accessory battery at a desired regulated value, said voltage regulator means comprising a switching means connected in series with said field winding and means responsive to the magnitude of the voltage applied to said accessory battery for controlling the switching state of said switching means, and circuit means connecting said field winding to the terminals of said cranking battery for charging said cranking battery by field discharge current produced by the voltage induced in said field winding when said switching means is switched to a nonconductive state.

4. A battery charging system for a dual-voltage motor vehicle electrical system comprising, first and second series-connected batteries, a generator having an output winding connected in circuit with said first battery for charging said first battery and having a field winding, means for energizing said field winding comprising a switching means connected in series with said field winding, means for causing said switching means to switch between conductive and nonconductive states as a function of the magnitude of the voltage generated in said output winding, circuit means connecting said field winding to the terminals of said second battery for charging said second battery by field discharge current produced by the voltage induced in said field winding when said switching means is switched to a nonconductive state, means for sensing the terminal voltage of said second battery and means coupled to said sensing means for terminating charging of said second battery when the terminal voltage of said second battery attains a predetermined value.

5. A battery charging system for a dual-voltage motor vehicle electrical system comprising, first and second series-connected batteries, an alternating current generator having an output winding and a field winding, rectifier means connected with said output winding and with said first battery for supplying charging current to said first battery, a field circuit for energizing said field winding from said output winding, voltage regulator means for maintaining the voltage applied to said first battery at a desired regulated value, said voltage regulator means comprising a switching means connected in series with said field winding and means responsive to the voltage applied to said first battery for controlling the switching state of said switching means, circuit means including a diode connecting said field winding to the terminals of said second battery for charging said second battery by field discharge current produced by the voltage induced in said field winding when said switching means is switched to a nonconductive state and means responsive to the terminal voltage of said second battery for diverting field discharge current into a current path that does not include said second battery when the terminal voltage of said second battery attains a predetermined value.

6. A battery charging system for a dual-voltage motor vehicle electrical system comprising, first and second series-connected batteries, an alternating current generator having an output winding and a field winding, rectifier means connected with said output winding and with said first battery for supplying charging current to said first battery, a field circuit for energizing said field winding from said output winding, voltage regulator means for maintaining the voltage applied to said first battery at a desired regulated value, said voltage regulator means comprising a switching means connected in series with said field winding and means responsive to the voltage applied to said first battery for controlling the switching state of said switching means, circuit means including a diode connecting opposite ends of said field winding to the terminals of said second battery for charging said second battery by field discharge current produced by the voltage induced in said field winding when said switching means is switched to a nonconductive state, the anode of said diode being connected to one end of said field winding, a controlled rectifier having an anode connected to the end of said field winding that is connected to the anode of said diode, a circuit connecting the opposite end of said field winding to the cathode of said controlled rectifier that provides part of a circuit for field discharge current that does not include said second battery when said controlled rectifier is gated conductive and means for gating said controlled rectifier conductive when the terminal voltage of said second battery attains a predetermined value.

* * * * *